US012597574B2

(12) United States Patent
Deng et al.

(10) Patent No.: US 12,597,574 B2
(45) Date of Patent: Apr. 7, 2026

(54) SPECIALLY PACKAGED RELAY AND PACKAGING METHOD THEREOF

(71) Applicant: Xiamen Hongfa Electroacoustic Co., Ltd., Xiamen (CN)

(72) Inventors: Yang Deng, Xiamen (CN); Yiqing Zhu, Xiamen (CN); Zhonghua Tan, Xiamen (CN); Rongjie Chen, Xiamen (CN)

(73) Assignee: Xiamen Hongfa Electroacoustic Co., Ltd., Xiamen (CN)

( * ) Notice: Subject to any disclaimer, the term of this patent is extended or adjusted under 35 U.S.C. 154(b) by 127 days.

(21) Appl. No.: 18/080,237

(22) Filed: Dec. 13, 2022

(65) Prior Publication Data

US 2023/0187154 A1 Jun. 15, 2023

(30) Foreign Application Priority Data

Dec. 15, 2021 (CN) ......................... 202111534502.9

(51) Int. Cl.
*H01H 50/12* (2006.01)
*H01H 50/02* (2006.01)
*H01H 50/14* (2006.01)

(52) U.S. Cl.
CPC .......... *H01H 50/023* (2013.01); *H01H 50/12* (2013.01); *H01H 50/14* (2013.01)

(58) Field of Classification Search
CPC ...... H01H 50/023; H01H 50/12; H01H 50/14; H01H 2009/0285; H01H 50/04;
(Continued)

(56) References Cited

U.S. PATENT DOCUMENTS 4,185,163 A 1/1980 Schedele
4,213,108 A 7/1980 Gross
(Continued)

FOREIGN PATENT DOCUMENTS

CN 101399135 A 4/2009
CN 203434059 U 2/2014
(Continued)

OTHER PUBLICATIONS

Partial European Search Report dated May 12, 2023, in connection with European Application No. 22213812.5.
(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

The present disclosure discloses a specially packaged relay and a packaging method thereof. The relay includes an electromagnetic relay and an injection molded body. The injection molded body is injection molded outside the electromagnetic relay and wraps the electromagnetic relay therein. A plurality of conventional terminals of the electromagnetic relay are respectively exposed, or the conventional terminals of the electromagnetic relay are respectively located within the injection molded body, and each of the conventional terminals of the electromagnetic relay is connected with an external terminal that is exposed. The electromagnetic relay of the present disclosure is completely wrapped and sealed by the injection molded body, and is completely isolated from external liquid, which can effectively prevent the external liquid from flowing into the electromagnetic relay and ensure the electromagnetic relay to work stably for a long time in a liquid environment.

9 Claims, 3 Drawing Sheets

(58) Field of Classification Search
CPC ............ H01H 49/00; B29L 2031/3406; B29C 45/14639; Y02D 10/00
USPC .......................................................... 335/202
See application file for complete search history.

(56) References Cited

U.S. PATENT DOCUMENTS

| | | | | |
|---|---|---|---|---|
| 11,699,864 B2 * | 7/2023 | Harimochi | H01R 4/38 439/620.01 |
| 2021/0012989 A1 * | 1/2021 | Lin | H01H 50/642 |

FOREIGN PATENT DOCUMENTS

| | | | |
|---|---|---|---|
| CN | 106158458 | A | 11/2016 |
| CN | 208970435 | U | 6/2019 |
| CN | 210984636 | U | 7/2020 |
| CN | 113555255 | A | 10/2021 |
| CN | 113823528 | A | 12/2021 |
| CN | 216719830 | U | 6/2022 |
| FR | 2 740 604 | A1 | 4/1997 |
| KR | 1998-0037586 | U | 9/1998 |

OTHER PUBLICATIONS

No Author Listed, WPI Week 201952. Clarivate Analytics. Thomson Scientific. 2017. 2 Pages.
Chinese Office Action dated Oct. 25, 2024, in connection with Chinese Application No. 202111534502.9.
European Communication pursuant to Article 94(3) EPC dated Apr. 11, 2025, in connection with European Application No. 22213812.5-1201.
European Communication pursuant to Article 94(3) EPC dated Nov. 19, 2025, in connection with European Application No. 22213812.5.
[No Author Listed], Low Pressure Overmoulding versus Potting or Encapsulation. XP093334433. May 2, 20203. 2 Pages.

* cited by examiner

SPECIALLY PACKAGED RELAY AND PACKAGING METHOD THEREOF

CROSS-REFERENCE TO RELATED APPLICATIONS

The present application is based on and claims the benefit of and priority to Chinese Patent Application No. 202111534502.9, filed on Dec. 15, 2021, the entire contents of which being incorporated herein by reference.

TECHNICAL FIELD

The present disclosure relates to the technical field of relays, in particular to a specially packaged relay and a packaging method thereof.

BACKGROUND

In recent years, energy consumption of data centers is concerned more and has become an important factor restricting a sustainable development of data center industry. In order to pursue high efficiency and energy saving, high requirements for cooling technology are required. The traditional air-cooling mode has large energy consumption, serious loss and high cost. In order to solve the above problems, an immersion liquid cooling method is proposed. The immersion liquid cooling can reduce damage of the device to a greater extent and improve operation efficiency of the device, which also conform to a concept of a friendly protective environment. The immersed liquid cooling helps to improve a heat dissipation design of the whole machine by directly immersing it into the liquid. The heat generated by electronic components inside the device is directly and efficiently transferred to the liquid, thereby reducing a demand for active cooling main parts such as thermal interface materials, heat sinks and fans.

A server device is directly immersed in the liquid, and for the components including an electromagnetic relay, a resistor, an inductor, a power semiconductor, a rectifier bridge, a transformer, a current transformer, etc. in the device, due to high insulation and heat dissipation effects of such liquid, sealed elements immersed in the liquid can have the same working capability under the atmosphere, and also strengthen the heat dissipation of the devices, and increase power density. However, for mechanical actuated switching elements such as an electromagnetic relay immersed in the liquid for a long time, it is necessary to prevent the liquid from being infiltrated into the electromagnetic relay, otherwise, the liquid may cause poor contact and action delay of the switch, and result in that the power supply fails to work normally. After practical verification, some non-mechanical actuated elements, such as a resistor, a power semiconductor, an inductor, a transformer, etc., are not affected by liquid resistance, and can work normally in the liquid after being packaged. However, for a conventional packaging of the electromagnetic relay, due to a few amount of glue around the cover and the base or the bobbin and a limited heat capacity of the terminal, there is a risk of liquid being infiltrated into the relay when the relay is immersed and works in the liquid for a long time. If liquid flows into inside of the electromagnetic relay, the liquid resistance will directly affect the contact, operation and release of the electromagnetic relay, and further affect the normal work of the power supply.

SUMMARY

To solve the technical problems existed in the prior art, the present disclosure provides a specially packaged relay and a packaging method thereof, which can solve the problem of a long-time working of an electromagnetic relay inside the device immersed in a liquid.

In order to solve the technical problems, the technical solution as proposed by the present disclosure is to provide a specially packaged relay including an electromagnetic relay and further including an injection molded body. The injection molded body is injection molded outside the electromagnetic relay and wraps the electromagnetic relay therein. A plurality of conventional terminals of the electromagnetic relay are respectively exposed, or the conventional terminals of the electromagnetic relay are respectively located within the injection molded body, and each of the conventional terminals of the electromagnetic relay is connected with an external terminal that is exposed.

Further, a portion of the external terminal that is exposed and the conventional terminal are located on opposite sides of the electromagnetic relay.

Further, the conventional terminal is located at an inner top of the injection molded body, and the external terminal is partially exposed from a bottom surface of the injection molded body.

Further, the electromagnetic relay is provided with a vent hole, and the vent hole and the portion of the external terminal that is exposed are located on adjacent sides or opposite sides of the electromagnetic relay.

Further, a plurality of heat dissipation grooves is respectively and circumferentially arranged on outer side surfaces of the injection molded body.

Further, an upper end of the heat dissipation groove protrudes upwardly, and a lower end of the heat dissipation groove does not penetrate through a bottom surface of the injection molded body.

Further, each of corners of the injection molded body is respectively provided with a chamfer.

Further, a material of the injection molded body is different from that of a cover of the electromagnetic relay, and the cover is more temperature resistant than the injection molded body.

Further, an upper end of the chamfer penetrates through a top surface of the injection molded body, and a lower end of the chamfer does not penetrate through a bottom surface of the injection molded body.

Further, a plurality of limiting grooves is arranged on a bottom surface of the injection molded body, for positioning the electromagnetic relay during an injection molding process of the injection molded body.

The present disclosure also provides a packaging method for a relay. In the packaging method, an injection molded body is injection molded outside an electromagnetic relay and wraps the electromagnetic relay therein, a plurality of conventional terminals of the electromagnetic relay are respectively exposed, or the conventional terminals of the electromagnetic relay are respectively located within the injection molded body, and each of the conventional terminals of the electromagnetic relay is connected with an external terminal that is exposed.

Compared with the prior art, the present disclosure has the following beneficial effects:

1. The injection molded body of the present disclosure is injection molded outside the electromagnetic relay and wraps the electromagnetic relay therein, only a plurality of conventional terminals of the electromagnetic relay are respectively exposed, or only the external terminals connected with the conventional terminals of the electromagnetic relay are respectively exposed, so that the electromagnetic relay may be a novel packaged relay, which is completely wrapped and closed by the injection molded body, and completely insulated from the external liquid, effectively blocks the external liquid from flowing into the electromagnetic relay, and ensures the electromagnetic relay to work stably in the liquid environment for a long time. Especially, when each of the conventional terminals of electromagnetic relay is connected with the external terminal, only the external terminal is exposed, which can solve a problem of leakage caused by welding thermal stress when the conventional lead pins of the electromagnetic relay are directly welded, thereby further improving the sealing performance of the present disclosure.

2. The portion of the external terminal that is exposed and the conventional terminal are located on opposite sides of the electromagnetic relay, so that the external terminal is extended in an opposite direction with respect to the conventional terminal, to ensure that the welding thermal stress generated when the external terminal is welded cannot affect a poor sealing portion of the electromagnetic relay at the conventional terminal.

3. The vent hole of the electromagnetic relay and the portion of the external terminal that is exposed are located on adjacent sides or opposite sides of the electromagnetic relay, so that the vent hole may not only be completely wrapped and closed by the injection molded body, but also be away from the exposed portion of the external terminal, to ensure that the welding thermal stress generated when the external terminal is welded cannot affect the poor sealing part of the electromagnetic relay at the vent hole.

4. The plurality of heat dissipation grooves are respectively arranged on outer side surfaces of the injection molded body, to reduce plastic accumulation while the injection molded body maintains a certain wall thickness and strength, and enhance the heat dissipation effect of the electromagnetic relay inside the injection molded body.

5. Each of the corners of the injection molded body is respectively provided with a chamfer, to reduce the plastic accumulation at the corners of the injection molded body, and enhance the heat dissipation effect of the electromagnetic relay located inside the injection molded body.

6. The material of the injection molded body is different from that of the cover of the electromagnetic relay, and the cover is more temperature resistant than the injection molded body, to ensure that the overall performance of the electromagnetic relay cannot be damaged during the injection molding.

7. A plurality of limiting grooves is arranged on the bottom surface of the injection molded body, for the convenience of positioning the electromagnetic relay in the injection molding process, to ensure the overall appearance of the injection molded relay and the size of the terminal.

The present disclosure will be further explained in detail with reference to the following drawings and embodiments. However, a specially packaged relay and a packaging method thereof according to the present disclosure are not limited to the embodiments.

Figure 1:
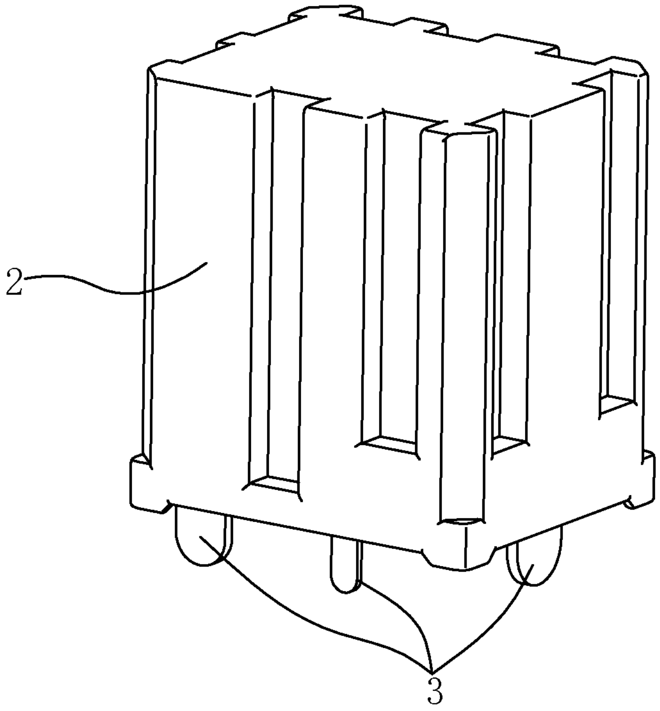
FIG. 1 is a schematic perspective view of the present disclosure.
Figure 2:
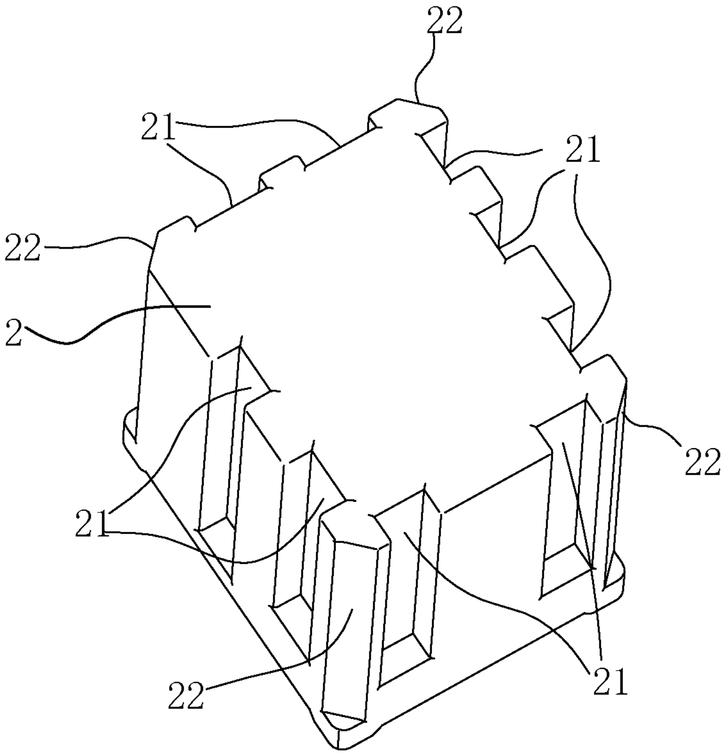
FIG. 2 is a schematic perspective view of the present disclosure.
Figure 3:
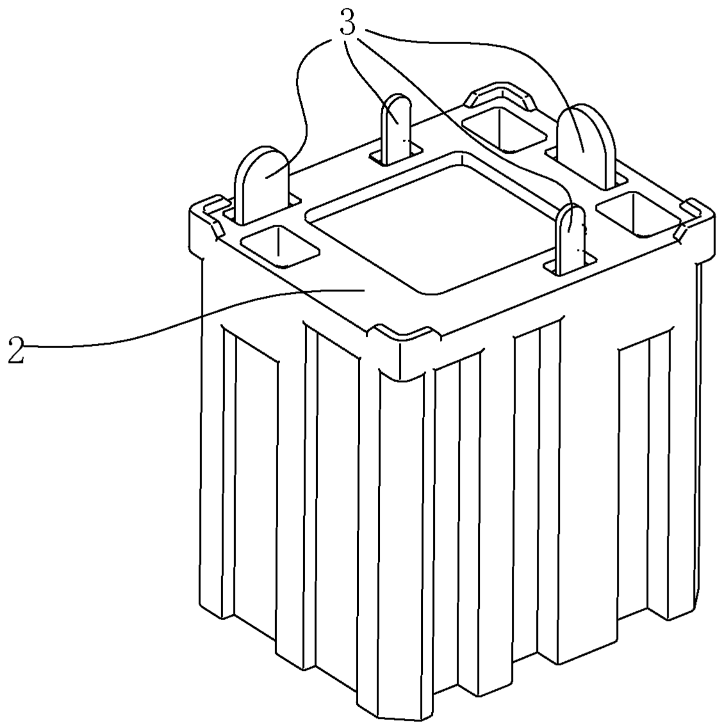
FIG. 3 is a schematic perspective view of the present disclosure.
Figure 4:
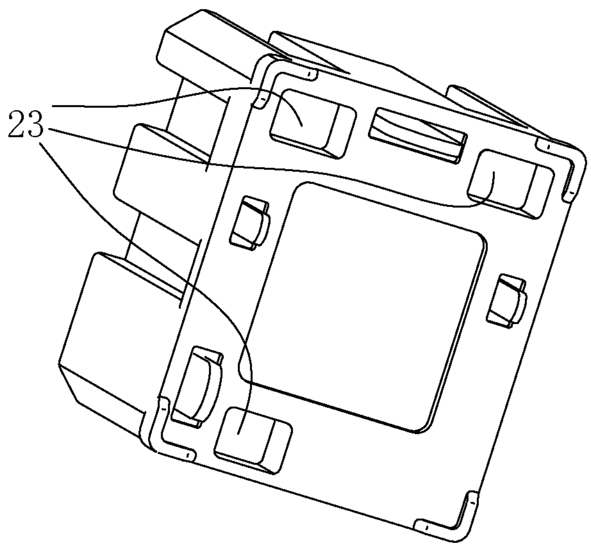
FIG. 4 is a schematic perspective view of the present disclosure.
Figure 5:
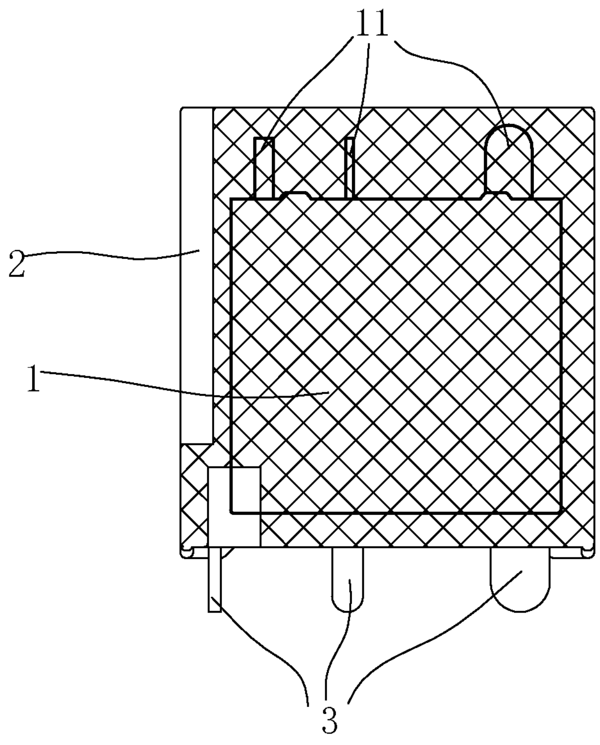
FIG. 5 is a cross-sectional view of the present disclosure.

Reference numbers in the drawings are as follows:

1 electromagnetic relay
- 11 conventional terminal
- 12 cover
- bobbin
  - 131 vent hole
- 14 base

2 injection molded body
- 21 heat dissipation groove
- 22 chamfer
- 23 limiting groove

3 external terminal

DETAILED DESCRIPTION

Referring to FIGS. 1-6, a specially packaged relay of the present disclosure includes an electromagnetic relay 1 and an injection molded body 2. The injection molded body 2 is injection molded outside the electromagnetic relay 1 and completely wraps the electromagnetic relay 1 therein, and only external terminals 3 respectively connected to conventional terminals 11 of the electromagnetic relay 1 are exposed. That is, a plurality of conventional terminals 11 of the electromagnetic relay 1 are respectively wrapped in the injection molded body 2, and each of the conventional terminals 11 of the electromagnetic relay 1 is connected with an external terminal 3, and the external terminal 3 is exposed out of the injection molded body 2. The conventional terminal 11 of the electromagnetic relay 1 refers to a terminal of the electromagnetic relay 1 itself, and the plurality of conventional terminals 11 of the electromagnetic relay 1 generally include a moving spring terminal, a static spring terminal and a coil terminal. In other embodiments, the conventional terminals of the electromagnetic relay are exposed, that is, each of the conventional terminals of the electromagnetic relay is exposed out of the injection molded body, in order to be welded and fixed with corresponding elements (such as PCB, etc.).

In this embodiment, a portion of the external terminal 3 that is exposed (i.e., the exposed portion of the external terminal) and the conventional terminal 11 are located on opposite sides of the electromagnetic relay 1. That is, the external terminal 3 is extended in an opposite direction with respect to the conventional terminal 11, so that a distance between the exposed portion of the external terminal 3 and the conventional terminal 11 is far enough, to ensure that a welding thermal stress generated when the exposed portion of the external terminal 3 is welded with the corresponding element (such as a PCB board, etc.) cannot affect a poor sealing part of the electromagnetic relay 1 at the conventional terminal 11. Specifically, the conventional terminals 11 are located at an inner top of the injection molded body 2, that is, the electromagnetic relay 1 is in an inverted state in the injection molded body 2, and the external terminals 3 are partially exposed from a bottom surface of the injection molded body 2.

Figure 6:
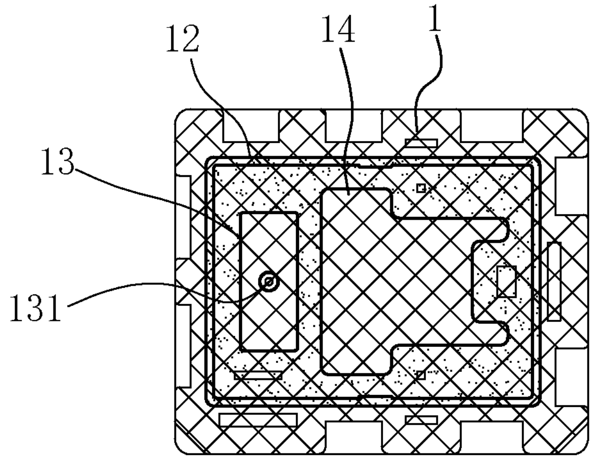
FIG. 6 is another cross-sectional view of the present disclosure.

In this embodiment, the electromagnetic relay 1 is provided with a vent hole 131 that is used to discharge an internal gas in a process of sealing inside the electromagnetic relay 1, and the vent hole 131 and the exposed portion of the external terminal 3 are located on the adjacent or opposite sides of the electromagnetic relay 1, wherein it is a preferable way to locate the vent hole 131 and the exposed portion of the external terminal 3 on the opposite sides of the electromagnetic relay 1. In this way, the distance between the exposed portion of the external terminal and a position where the vent hole 131 is located may be as far as possible, to ensure that the welding thermal stress generated when the exposed portion of the external terminal 3 is welded with the corresponding element (such as PCB board, etc.) cannot affect the poor sealing part of the electromagnetic relay 1 at the vent hole 131. Since the external terminal 3 is partially exposed from the bottom surface of the injection molded body 2, and the electromagnetic relay 1 is in the inverted state in the injection molded body 2, that is, the exposed portion of the external terminals 3 is located at a lower side of the electromagnetic relay 1, the vent hole 131 may be located at an upper side of the electromagnetic relay 1 or at either side (i.e., left, right, front or rear side) of the electromagnetic relay 1. Specifically, the vent hole 131 may be provided on a side wall of a cover 12 of the electromagnetic relay 1 or a member of the electromagnetic relay 1 that blocks an opening of the cover 12, wherein the member may be a base 14 or a bobbin 13 or a combination of the base 14 and the bobbin 13, as shown in FIG. 6, the vent hole 131 is specifically provided on the bobbin 13. A material of the injection molded body 2 is different from that of the cover 12 of the electromagnetic relay, and the cover 12 is more temperature resistant than the injection molded body 2, to ensure that an overall performance of the electromagnetic relay 1 cannot be damaged during the injection molding. The cover 12 of the electromagnetic relay may be made of metal or plastic, and when the cover 12 of the electromagnetic relay is made of plastic, for example, a plastic injection molded body and a plastic cover of the electromagnetic relay in the present disclosure are integrally combined in an injection molding manner, which breaks a traditional limitation that only metal is embedded in the plastic for insert injection molding.

In this embodiment, the injection molded body 2 has a square shape, and a plurality of heat dissipation grooves 21 are respectively arranged on outer side surfaces of the injection molded body 2. The heat dissipation groove 21 is elongated and located in a vertical direction. An upper end of the heat dissipation groove 21 upwardly penetrates out, and a lower end of the heat dissipation groove 21 does not penetrate through the bottom surface of the injection molded body 2. Each of corners of the injection molded body 2 is provided with a chamfer 22, and the chamfer 22 has an upper end that penetrates through a top surface of the injection molded body 2, and a lower end that does not penetrate through the bottom surface of the injection molded body 2. The arrangement of the heat dissipation grooves 21 and the chamfers 22 can reduce the accumulation of plastics and enhance the heat dissipation effect of the electromagnetic relay 1 located inside the injection molded body 2 on the basis of that the injection molded body 2 having a certain wall thickness and strength can be ensured. The heat dissipation groove 21 and the chamfer 22 do not penetrate through the bottom surface of the injection molded body 2, which can ensure the integrity and thickness of the bottom of the injection molded body 2, and also make a room for the limiting groove as described below.

In this embodiment, a plurality of limiting grooves 23 are provided on the bottom surface of the injection molded body 2, for positioning the electromagnetic relay 1 during the injection molding process of the injection molded body 2, to ensure the overall appearance of the injection molded relay and the size of the terminals thereof.

The present disclosure relates to a specially packaged relay having an injection molded body 2 and an electromagnetic relay 1 that are integrally formed in an injection molding manner, and the electromagnetic relay 1 is completely wrapped by the injection molded body 2, and only secondary connection terminals (i.e., the external terminals 3) of the electromagnetic relay 1 are exposed. Therefore, the relay of the present disclosure may be regarded as an independent part entity, rather than an assembly, and the liquid cannot be infiltrated into the inside of the relay from any possible "gap" like the previous assembly. The gaps between the conventional terminals 11, the bobbin 13, the cover 12 and other parts of the electromagnetic relay 1 are fixed by an epoxy resin, and have few amount of glue therein, which is generally a poor sealing portion of the electromagnetic relay 1. For the traditional electromagnetic relay, the welding process of the conventional terminals is easily affected by the thermal stress, and the liquid is easy to flow into the interior after these poor sealing portions are broken by the thermal stress. According to the present disclosure, after the electromagnetic relay 1 is inverted, the poor sealing portions of the electromagnetic relay 1 face upwards and are wrapped by the thick top of the injection molded body 2, so that the liquid cannot contact these portions. Specifically, the conventional terminal 11 of the electromagnetic relay 1 of the present disclosure is connected to the external terminal 3, and the external terminal 3 is extended in the opposite direction with respect to the conventional terminal 11, so that the distance between the exposed portion of the external terminal 3 and the conventional terminal 11 is far enough to ensure that the welding thermal stress generated when the exposed portion of the external terminal 3 is welded with the corresponding element (such as PCB board, etc.) cannot affect the poor sealing portion of the electromagnetic relay 1 at the conventional terminal 11. In practical use, only the exposed portion of the external terminal 3 needs to be welded. Even if the welding process is affected by thermal stress, the poor sealing portion of the conventional terminal 11 of the electromagnetic relay 1 may not be broken, and the liquid cannot be infiltrated into the inside of the electromagnetic relay 1. The vent hole 131 of the electromagnetic relay 1 is also arranged close to the top surface of the injection molded body 2, and is wrapped by the thick top of the injection molded body 2, so that liquid cannot contact the vent hole 131.

According to the specially packaged relay of the present disclosure, the electromagnetic relay 1 after being specially packaged by the injection molded body 2 may be immersed in the liquid for a long time during the working process, to ensure the normal operation of the immersed liquid-cooled server, reduce the overall loss of the server device of the electric data center and improve its operation efficiency. If the injection molded body is injection molded as a plastic cover in advance, and then the electromagnetic relay is installed in the plastic cover and an opening end of the plastic cover is sealed with a sealant, a demand for the sealing process of the sealant is very high; otherwise, once bubbles appear in the sealant during the sealing process, the overall sealing performance will be seriously affected, and the sealant is easy to be aging and fall off in comparison with the plastic cover. Therefore, compared to a method in which the plastic cover and the sealant are combined to perform a second sealing for the electromagnetic relay, the packaging method of the present disclosure in which the electromagnetic relay and the injection molded body are integrally injection-molded obviously allows the sealing performance of the present disclosure more reliable and more suitable for long-term stable work in the liquid.

In the packaging method of the present disclosure, an injection molded body is injection molded outside an electromagnetic relay and wraps the electromagnetic relay therein, a plurality of conventional terminals of the electromagnetic relay are respectively exposed, or the conventional terminals of the electromagnetic relay are respectively located within the injection molded body, and each of the conventional terminals of the electromagnetic relay is connected with an external terminal that is exposed.

In this embodiment, the electromagnetic relay is in an inverted state in the injection molded body, and the external terminals are extended in the opposite direction with respect to the conventional terminals.

In this embodiment, the vent hole of the electromagnetic relay and the portion of the external terminal that is exposed are located on adjacent sides or opposite sides of the electromagnetic relay.

In this embodiment, the material of the injection molded body is different from that of the cover of the electromagnetic relay, and the cover is more temperature resistant than the injection molded body, to ensure that the overall performance of the electromagnetic relay cannot be damaged during the injection molding.

According to the packaging method of the relay of the present disclosure, a structure of the formed injection molded body 2 is shown in FIGS. 1-6, and a plurality of heat dissipation grooves 21 are respectively and circumferentially arranged on outer side surfaces of the injection molded body 2, to reduce the plastic accumulation and increase the heat dissipation effects of the electromagnetic relay 1. Each of the corners of the injection molded body 2 is provided as a chamfer 22 to reduce plastic accumulation.

According to the packaging method of the relay provided by the present disclosure, the electromagnetic relay may be a novel packaged relay, which is completely wrapped and closed by the injection molded body, and completely insulated from the external liquid, effectively blocking the external liquid from flowing into the electromagnetic relay, and ensures the electromagnetic relay to work stably in the liquid environment for a long time.

The above embodiments are merely used to further illustrate a specially packaged relay and a packaging method of the present disclosure, but the present disclosure is not limited thereto. Any simple modifications, equivalent changes and modifications made to the above embodiments according to the technical essence of the present disclosure fall within the protection scope of the technical solution of the present disclosure.

What is claimed is:

1. A packaged relay, comprising an electromagnetic relay, wherein the relay further comprises an injection molded body which is injection molded outside the electromagnetic relay and wraps the electromagnetic relay therein, a plurality of terminals of the electromagnetic relay are respectively exposed, or the plurality of terminals of the electromagnetic relay are respectively located within the injection molded body, and each of the terminals of the electromagnetic relay is connected with an external terminal that is exposed, wherein a plurality of heat dissipation grooves are respectively and circumferentially arranged on outer side surfaces of the injection molded body, and an upper end of the heat dissipation groove protrudes upwardly, and a lower end of the heat dissipation groove does not penetrate through a bottom surface of the injection molded body.

2. The packaged relay according to claim 1, wherein a portion of the external terminal that is exposed and the terminal are located on opposite sides of the electromagnetic relay.

3. The packaged relay according to claim 2, wherein the terminal is located at an inner top of the injection molded body, and the external terminal is partially exposed from a bottom surface of the injection molded body.

4. The packaged relay according to claim 2, wherein the electromagnetic relay is provided with a vent hole, and the vent hole and the portion of the external terminal that is exposed are located on adjacent sides or opposite sides of the electromagnetic relay.

5. The packaged relay according to claim 1, wherein the terminal is located at an inner top of the injection molded body, and the external terminal is partially exposed from a bottom surface of the injection molded body.

6. The packaged relay according to claim 1, wherein the electromagnetic relay is provided with a vent hole, and the vent hole and the portion of the external terminal that is exposed are located on adjacent sides or opposite sides of the electromagnetic relay.

7. The packaged relay according to claim 1, wherein each of corners of the injection molded body is respectively provided with a chamfer; an upper end of the chamfer penetrates through a top surface of the injection molded body, and a lower end of the chamfer does not penetrate through a bottom surface of the injection molded body.

8. The packaged relay according to claim 1, wherein a material of the injection molded body is different from that of a cover of the electromagnetic relay, and the cover is more temperature resistant than the injection molded body.

9. The packaged relay according to claim 1, wherein a plurality of limiting grooves is arranged on a bottom surface of the injection molded body, for positioning the electromagnetic relay during an injection molding process of the injection molded body.

* * * * *